B. R. HAWLEY.
Heating and Ventilating Buildings.
No. 5,001. Reissued July 23, 1872.
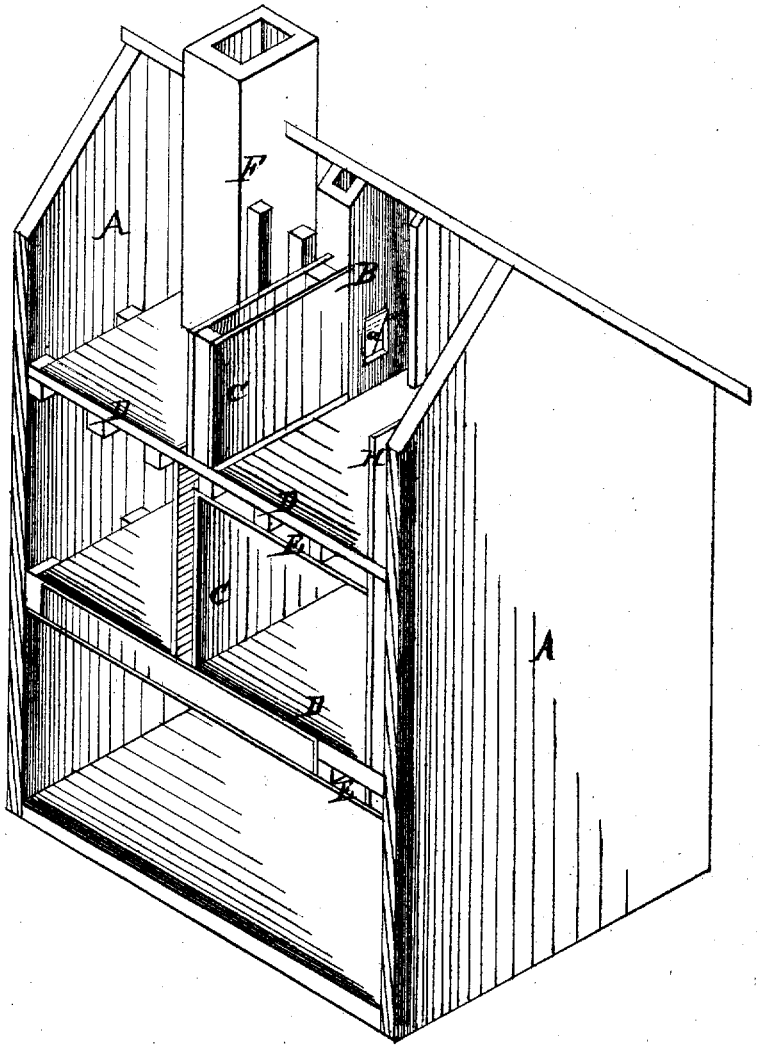
Witnesses
John H Stiff
Wm T Brown
Inventor
B R Hawley
AM. PHOTO-LITHOGRAPHIC CO. N.Y. (OSBORNE'S PROCESS.)

UNITED STATES PATENT OFFICE.

BENJAMIN R. HAWLEY, OF NORMAL, ILLINOIS.

IMPROVEMENT IN HEATING AND VENTILATING BUILDINGS.

Specification forming part of Letters Patent No. 98,372, dated December 28, 1869; reissue No. 5,001, dated July 23, 1872.

Specification describing certain Improvements in Heating and Ventilating Buildings, invented by BENJAMIN R. HAWLEY, of Normal, Illinois.

My invention relates to improvements in heating and ventilating buildings upon the system in which the air, after passing through the room, is exhausted through hollow partitions from the top or upper parts of the buildings downward and into the draught-chimney at the bottom; and it consists, first, of a peculiar arrangement of valves or registers in the flues for conducting the heated air into the rooms from the furnace below, whereby the discharge of the necessary amount of air into the lower rooms will be secured, and the overheating of the upper rooms, which is common with the ordinary arrangement of registers, is avoided. Secondly, my invention consists in having the plaster wall next to the outer walls all round the house continuous from bottom to top, except the openings for doors, windows, &c., particularly between the ceilings and floors, so as to cut off admission of external air to interfere with the draught in exhausting from the top downward through the hollow walls of the interior partitions, as it will without having said walls continuous and air-tight; for, as the outer walls, particularly of wood houses, generally have many openings through which the air can pass readily, and the spaces between the floors and ceilings are open next to the outer walls, the air can flow into the said spaces, whereby the exhaust from the rooms would be defeated. Thirdly, my invention consists in arranging the down-draught or exhaust-passages in the interior partition-walls of the house, to avoid the chilling of the exhausting air, and consequent obstruction of the draught, common to the arrangement of such passages in the outer hollow walls.

The drawing represents a perspective view of a house with one side and part of the roof removed, showing the application of my improvements.

A represents the walls of a house; B, the hot-air flue, beneath which is the heater or furnace for heating the air in cold weather, to be conducted to the rooms through the flue B, which will have a passage opening into each room, in which I propose to have a valve, *a*, for closing and opening said passages, said valve to be pivoted at or near the upper end so as to swing into the vertical passage of the flue, and contract it as it opens the passage into the room to measurably shut the air off from the upper rooms and cause that portion which comes against the under side of the valve to be turned through the passage into the room, and thus prevent it from passing by to the top of the flue, as it does when the ordinary registers are used. The air, after heating the rooms, or circulating therein for ventilation, escapes at the bottom through the floors and base-boards, which are perforated or otherwise suitably arranged for the purpose, into the spaces between the floors D and ceilings E, and to the spaces in the hollow partition-walls C, through which it is drawn down to the basement and escapes thereat through any suitable passage to the draught-chimney F. H represents one of the before-mentioned continuous in-walls next to the outer wall A, extending from top to bottom of the building through the spaces between the floors D and ceilings E, to cut off the external air and prevent it from interfering with the draught. The passages for drawing and conducting the air from the rooms downward to the entrance-passage to the draught-flue F are arranged, as it will be noted, only in interior partition-walls C, so that the escaping air will not be liable to be cooled by the external air in cold weather, as it is in passing down through exterior hollow walls, which have always been heretofore used in this system of heating and ventilating.

This plan of heating and ventilating will be utterly defeated without the continuous walls H, no matter how well all the other necessary conditions may be guarded; and the same is true in regard to the hollow wall passages for drawing the air downward, if not located entirely within the building, so as to be surrounded by warm air, to avoid the chilling of the air within the passages, which occurs when said passages are in the outside walls, and stops the draught.

I claim as my invention—

1. The valve *a*, pivoted in the opening in the flue B for conducting the air to the rooms in such manner as to swing into said flue and contract the vertical passage therein as it opens the passage into the room, substantially as specified.

2. The continuous air-tight in-walls H, next to the outer walls, extending from bottom to top in such manner as to prevent the external air from flowing in between the floor and ceilings and obstructing the draught, substantially as specified.

3. The interior partition-wall C, arranged to serve as exhaust-passages, substantially as set forth.

B. R. HAWLEY.

Witnesses:
JOHN H. STITT,
WM. H. BROWN.